INVENTORS
HERMANN OBERST
JOACHIM EBIGT
GÜNTHER DUVE
ALFRED SCHOMMER

BY Curtis, Morris & Safford
ATTORNEYS

United States Patent Office 3,554,855
Patented Jan. 12, 1971

3,554,855
VIBRATION DAMPED SANDWICH SYSTEMS HAVING INTERLAYERS OF A MIXTURE OF TWO EXTERNALLY PLASTICIZED COPOLYMERS CAPABLE OF BEING CROSS-LINKED
Hermann Oberst, Hofheim, Taunus, Joachim Ebigt and Günther Duve, Frankfurt am Main, and Alfred Schommer, Bad Soden, Taunus, Germany, assignors to Farbwerke Hoechst Aktiengesellschaft vormals Meister Lucius & Bruning, Frankfurt am Main, Germany, a corporation of Germany
Filed Nov. 21, 1967, Ser. No. 684,741
Claims priority, application Germany, Nov. 25, 1966, F 50,756
Int. Cl. B32b 15/08; E04b 1/99
U.S. Cl. 161—165                               8 Claims

ABSTRACT OF THE DISCLOSURE

A vibration damped sandwich system comprising hard plates and a vibration damping, self-adherent interlayer consisting of a mixture of (a) a mixture of a copolymer I of vinyl acetate and dibutyl maleate and a copolymer II of vinyl acetate and crotonic acid, (b) at least one plasticizer and (c) a bifunctional epoxide soft resin, which interlayer is subjected to a thermal treatment to bring about cross-linking. Vibration damped sandwich systems having interlayers of a mixture of two externally plasticized copolymers capable of being cross-linked.

---

Figure 1A:
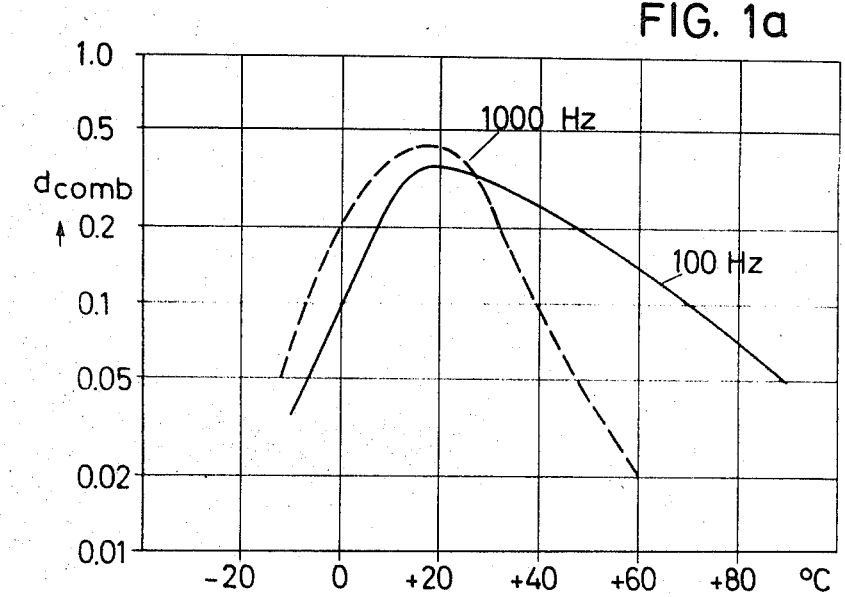

The present invention provides vibration damped sandwich systems having interlayers made of a mixture of two externally plasticized copolymers capable of being cross-linked.

It is known from South African specification No. 3700/60 that highly valuable vibration damping materials of a broad temperature band suitable for damping bending vibrations of metal sheet constructions can be prepared by blending one or several homo- and/or copolymeric components extrenally plasticized with suitable plasticizers and one or several homo- and/or copolymeric components which do not absorb or absorb to a small extent only the said plasticizers, the second order transition temperatures of the individual components differing by at least 10° C. and the different second order transition temperatures being substantially maintained.

South African specification No. 3701/60 teaches that vibration damping materials of broad temperature band of the aforesaid type may consist of a mixture of homo- and/or copolymeric components externally plasticized while being in admixture with suitable plasticizers, whereby in the thermodynamic equilibrium the plasticizers are divided among the components mixed in a suitable proportion by weight in such a manner that after the migration of the plasticizers the second order transition temperatures of the components differ by at least 10° C.

The present invention provides vibration damped sandwich systems having especially valuable properties which comprise two plates and interposed in between a layer consisting of a mixture of the following composition:

(a) 52 to 70% by weight of a mixture of a copolymer I of vinyl acetate and dibutyl maleate in a proportion by weight of the monomers of 60:40 to 80:20, preferably 70:30, and a copolymer II of vinyl acetate and crotonic acid in proportion by weight of the monomers of 90:10 to 96:4, preferably 95:5, the proportion of copolymer II being at least equal to that of copolymer I and the proportion of copolymer I possibly being zero, (b) 40 to 22% by weight of at least one plasticizer, for example esters of phthalic acid such as diamylphthalate, dihexyl phthalate, dioctyl phthalate, dinonyl phthalate, didecyl phthalate, diisooctyl phthalate, diisononyl phthalate, diisodecyl phthalate, dicyclohexyl phthalate; mixed esters of phthalic acid containing different to the aforesaid alcohol components; or esters of phosphoric acid such as trihex 1 phosphate, tricresyl phosphate, diphenyl-cresyl phosphate, diphenyl-xylenyl phosphate and diphenyl-octyl phosphate, (c) 8 to 10% by weight of a bifunctional epoxide soft resin, preferably a diepoxide of an aliphatic poly-alcohol having 6 to 10 carbon atoms and a content of 0.61 to 0.72 mole of epoxide group in 100 grams of resin.

It is suitable, in general, to use plasticizer mixtures, above all mixtures of di-2-ethylhexyl phthalate and tricresyl phosphate; plasticizer mixtures of equal proportions of the two latter compounds being especially suitable.

As epoxide soft resin there may be used, for example, Epikote 812®. The manufacture of epoxide soft resins is described for example in 'Epoxydverbindungen und Epoxydharze" by A. M. Paquin, Springer Verlag, Berlin 1958.

In each case the amounts of the specified components are to be chosen in the indicated ranges in such a manner that their sum amounts to 100.

To optimize the desired vibration damping properties the interlayers must be subjected to a thermal after-treatment at a temperature in the range of from about 150 to 210° C. This thermal treatment brings about a cross-linking of the epoxide and carboxyl groups.

The present invention therefore provides sandwich systems of hard plates, in particular metal sheets, with vibration damping, self-adherent interlayers of a thermally after treated mixture comprising (a) 52 to 70% by weight of a mixture of a copolymer I of vinyl acetate and dibutyl maleate in a proportion by weight of the monomers of 60:40 to 80:20, preferably 70:30 and a copolymer II of vinyl acetate and crotonic acid in a proportion by weight of 90:10 to 96:4, preferably 95:5, the proportion of copolymer II being at least equal to the proportion of copolymer I and the proportion of copolymer I possibly being zero, (b) 40 to 22% by weight of at least one plasticizer, for example esters of phthalic acid such as diamyl phthalate, dihexyl phthalate, dioctyl phthalate, dinonyl phthalate, didecyl phthalate, diisoctyl phthalate, diisononyl phthalate, diisodecyl phthalate, dicyclohexyl phthalate; mixed esters of phthalic acid carrying different to the aforesaid alcohol radicals; and esters of phosphoric acid such as trihexyl phosphate, tricresyl phosphate, diphenyl-cresyl phosphate, diphenyl-xylenyl phosphate and diphenyl-octyl phosphate, (c) 8 to 10% by weight of a bifunctional expoxide soft resin, preferably a diepoxide of an aliphatic polyalcohol having 6 to 10 carbon atoms and a content of 0.61 to 0.72 mole of epoxide group in 100 grams of resin, all percentages being calculated on the total mixture of components (a)+(b)+(c).

In general, it is advantageous to use a mixture of plasticizers especially a mixture of di-2-ethylhexyl phthalate and tricresyl phosphate and more especially a mixture of equal proportions of the two latter compounds.

Because of the easy workability of the sandwich systems the thermal after-treatment at a temperature of about 150 to 200° C. to bring about cross-linking is suitably carried out after the manufacture of the laminated systems.

Figure 1B:
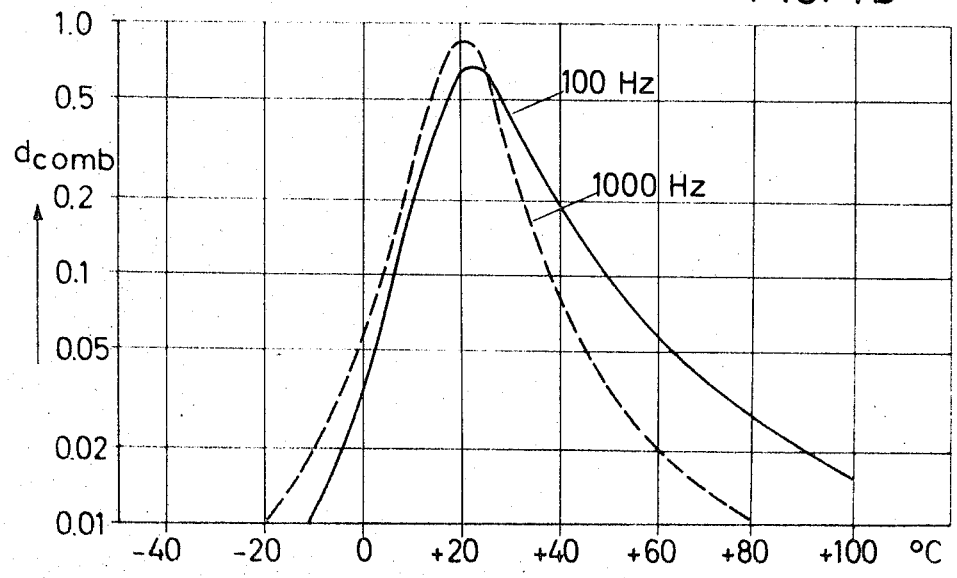

A comparison of FIGS. 1a and 1b of the accompanying drawings illustrates the superior efficiency of the novel systems as to their vibration damping properties. The curve in FIG. 1a shows the loss factor $d_{comb}$ of a metal sheet arrangement of the invention as a function of temperature. For comparison, one of the most effective vibration damping materials known for metal sheet arrangements was used, namely a copolymer of 63% by weight of vinyl acetate and 37% by weight of dibutyl maleate containing as plasticizer 15% by weight of 2-ethylhexyl phthalate and 15% by weight of tricresyl phosphate, calculated on the mixture (curve in FIG. 1b). The copolymer shown in the curve of FIG. 1b was a thermoplastic adhesive especially suitable for producing vibration damped metal sheet arrangements comprising two outer metal sheets and a self-adherent thermoplast as vibration damping interlayer. Systems of this type provide a damping effect which is extremely high in its maximum and cannot be exceeded for physical reasons (cf. H. Oberst and A. Schommer, Kunststoffe, volume 55, page 634 (1965), especially FIG. 9). In a symmetrical arrangement comprising two metal sheets each having a thickness of 0.5 millimeter and an interlayer 0.3 millimeter thick, the loss factor $d_{comb}$ of the combined system, measured in the bending wave method (cf. for example. H. Oberst, L. Bohn and F. Linhardt, Kunststoffe, volume 51, page 495 (1961)), almost reaches the value $d_{comb}$ of 1. The known metal sheet constructions damped by one-side damping coatings, which are applied by spraying, trowelling or bonding as layers of so-called vibration damping meterials, show loss factors generally less than $d_{comb}=0.2$ with technically reasonable thickness or ratios of coating mass to plate mass. By means of metal sheet sandwich systems which are gaining in importance in recent times, it is possible to obtain damping values increased by a multiple when the interlayer material has an optimum composition and thickness, as is shown by the present example.

The temperature band width of the damping in the metal sheet sandwich system does not only depend on the viscoelastic values of the interlayer and of the steel sheets, but to a considerable extent also on the "geometry" of the arrangement, i.e. on the ratio of the layer thicknesses (see loc. cit. (1965) FIGS. 8 to 10). In the case of metal sheet sandwich systems it is advantageous to define the band width to be the range of temperature interval within which the value $d_{comb}=0.05$ is exceeded. The damping effect of metal sheets which are not damped by additional vibration damping means in metal sheet constructions of different types, corresponds to values $d_{comb}=0.01$, the reference value $d_{comb}=0.05$ thus means a considerable increase in the damping effect by about 15 db (decibel) as compared to the "nil damping" $d_{comb}=0.01$.

In the curve shown in FIG. 1b, the reference value $d_{comb}=0.05$ is exceeded in the mainly interesting frequency range of from 100 to 1,000 c.p.s. (Hz) at a temperature ranging from about 0 to 50° C., the temperature band width therefore amounts to about 50° C. It is for this reason that sandwich systems of this type are suitable for many technical fields of application. By modifying the content of pasticizer it is possible to shift the temperature band of a high damping effect to higher temperatures and thus to adapt it to special technical uses, for example in machine units operating at elevated temperature. This type of metal sheet sandwich system comprising a self-adherent interlayer of optimum composition and thickness of a vibration damping material having a broad temperature band prepared by copolymerization of appropriate monomeric components has hitherto not been excelled by other arrangements of similar kind and can therefore be regaded as standard system for judging the acoustic efficiency of the system of the invention.

FIG. 1a and 1b show the temperature curves of the loss factor $d_{comb}$ of metal sheet sandwich systems comprising two steel sheets of a thickness of 0.5 millimeter each and a damping interlayer 0.3 millimeter thick for frequencies of 100 and 1,000 c.p.s. The curves were measured with sandwich systems the inerlayers of which consisted of (1a) a mixture comprising (1) a mixture of 33 parts by weight of a copolymer of vinyl acetate and dibutyl maleate in a proportion by weight of 70:30 and 33 parts by weight of a copolymer of vinyl acetate and crotonic acid in a proportion by weight of 95:5, (2) 13 parts by weight of di-2-ethylhexyl phthalate and 13 parts by weight of tricresyl phosphate as plasticizer mixture and (3) 8 parts by weight of a diepoxide of an aliphatic polyalcohol having 6 to 10 carbon atoms and a content of 0.61 to 0.72 mole of epoxide group in 100 grams of resin (commercially available in Epikote 812®) a bifunctional epoxide soft resin, (1b) a copolymer of 63% by weight of vinyl acetate and 37% by weight of dibutyl maleate containing 15% by weight of 2-ethylhexyl phthalate and 15% by weight of tricresyl phosphate calculated on the mixture.

The sandwich systems comprising the interlayer according to the invention were subjected to a thermal aftertreatment of 15 minutes at 190° C.

The arrangement according to the invention (FIG. 1a), the interlayer of which consisted of a mixture with a proportion by weight of the components in the indicated optimum range, had straight damping curves and a surprisingly broad temperature band with a relatively high damping maximum (in the neighbourhood of 20° C.) at the technically most interesting low frequencies around 100 c.p.s., which are relatively very high although they do not fully reach the maximum damping effects of FIG. 1b. The technically important large temperature band of about 100° C. at 100 c.p.s. is connected according to physical law with a certain flattening of the maximum values. The width of the temperature band is especially important at low frequencies because when resonance vibrations are built up the number of bending wave lengths over the given sheet dimensions is decisive; the higher the number of wave lengths on the given distances the stronger the damping of the resonances with a given loss factor. With low frequencies the wave lengths are the longest and therefore their number over the constructions is relatively small. FIG. 1a shows that at 100° C. a considerable damping effect can still be obtained.

A further acoustic advantage of the mixtures to be used according to the invention over the comparative interlayer material of FIG. 1b resides in the fact that the damping effect extends to lower temperatures (below 0° C.).

It should furthermore be mentioned that the mixture of the invention has technologically advantageous properties. The main advantage is that after the thermal treatment the interlayer does no longer flow owing to the cross linking reaction so that at high temperatures no material flows out at the edges of the constructions. A further advantage is that the epoxide and carboxyl groups as well as the substituted esters forming therefrom improve the adhesiveness of the interlayers so that degreasing of the metal sheets becomes less critical.

The necessary thermal after-treatment (for cross linking) does not complicate noticeably the working of the laminated systems. In many cases high temperatures are anyhow required, for example to burn in the lacquer. During the manufacture of the laminated systems and the usual shaping the temperatures applied are sufficiently low so that the desired flowability is not yet impaired by the cross-linking reaction which proceeds slowly at low temperatures. During the manufacturing of the sandwich systems the mixture according to the invention represents a thermoplastic material, that is a thermoplastic adhesive which can be applied by trowelling, brushing or pouring at sufficiently elevated temperatures.

The laminated systems can be processed within wide limits as normal metal sheets, i.e. they may be creased, bent, shaped, welded and riveted. They may even be deep-drawn provided that the radii of curvature are not too small. There are obtained laminated systems having a damping height and a temperature range of damping well suitable for many fields of application, in particular at relatively high operation temperatures.

Small amounts of filler, for example for improving the electric conductivity (improvement of resistance welding) may be added to the vibration damping material. In order not to affect the damping effect adversely it is advantageous to add less than 1% by weight, preferably less than 0.5% by weight, of filler, calculated on the proportion of copolymers in the interlayer mixture. Appropriate fillers are, for example, heavy spar, silicic acid, graphite and soot.

The total thickness of the sandwich system of the invention preferably ranges between 1 and 6 millimeters. The interlayer may be from 0.1 to 1 millimeter thick, preferably from 0.2 to 0.5 millimeter. The maximum damping effect is obtained in symmetrical sandwich systems. The stiffness in flexure and the strength, however, are higher in asymmetric systems having the same weight. These asymmetric sandwich systems are therefore preferred for uses which require an optimum strength with respect to the weight. The ratio of thicknesses of the metal sheets preferably ranges between 1:1 and 1:4.

Figure 2A:
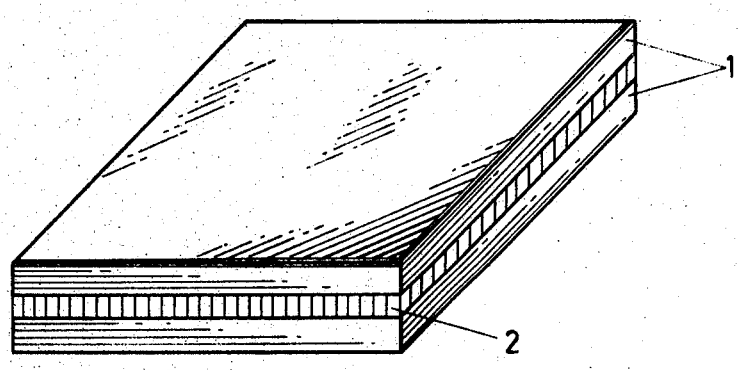
Figure 2B:
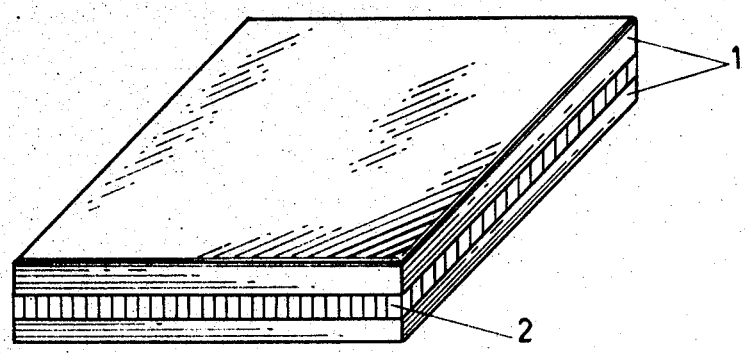

FIG. 2 of the accompanying drawings shows sandwich systems of the invention having a symmetrical arrangement (a) and an asymmetric arrangement (b). Between the two outer plates or sheets 1 the vibration damping interlayer 2 is interposed.

What is claimed is:
1. A vibration damped sandwich system consisting essentially of hard plates and a vibration damping, self-adherent cross-linked interlayer consisting of a mixture of
  (a) 52 to 70% by weight of a mixture of a copolymer I of vinyl acetate and dibutyl maleate in a proportion by weight of the monomers of 60:40 to 80:20 and a copolymer II of vinyl acetate and crotonic acid in a proportion by weight of the monomers of 90:10 to 96:4, the proportion of copolymer II being at least equal to the proportion of copolymer I and the proportion of copolymer I possibly being zero,
  (b) 40 to 22% by weight of at least one plasticizer selected from the group consisting of esters and mixed esters of phthalic acid and esters of phosphoric acid, and
  (c) 8–10% by weight of a diepoxide of an aliphatic alcohol having 6 to 10 carbon atoms and a content of 0.61 to 0.72 mole of epoxide group in 100 grams of resin, all percentages being calculated on the total mixture of components $a+b+c$.

2. The sandwich system of claim 1, wherein the hard plates are metal sheets.

3. The sandwich system of claim 1, wherein the proportion by weight of the monomers in copolymer I of the interlayer mixture is 70:30 and the proportion by weight of the monomers in copolymer II of the interlayer mixture is 95:5.

4. The sandwich system of claim 1, wherein component (b) of the interlayer mixture is diamyl phthalate, dihexyl phthalate, diooctyl phthalate, dinonyl phthalate, didecyl phthalate, diisooctyl phthalate, diisonoynl phthalate, diisodecyl phthalate, dicyclohexyl phthalate, trihexyl phosphate, tricresyl phosphate, diphenylcresyl phosphate, diphenylxylenyl phosphate, diphenyloctyl phthalate or a mixture of the said compounds.

5. The sandwich system of claim 1, wherein component (b) of the interlayer mixture is a mixture of di-2-ethylhexyl phthalate and tricresyl phosphate.

6. The sandwich system of claim 1, wherein component (a) of the interlayer mixture contains up to 1% by weight of filler, calculated on the copolymer proportion.

7. The sandwich system of claim 1, wherein the ratio of the thicknesses of the two outer plates preferably is in the range of from 1:1 to 1:4.

8. The sandwich system of claim 1, the interlayer of which had been subjected to a thermal after-treatment at a temperature in the range of from 150 to 210° C.

References Cited
UNITED STATES PATENTS

| | | | |
|---|---|---|---|
| 3,271,188 | 9/1966 | Albert et al. | 161—218X |
| 3,354,109 | 11/1967 | Evans et al. | 260—31.8(ME) |
| 3,399,103 | 8/1968 | Salyer et al. | 161—218X |
| 3,399,104 | 8/1968 | Ball et al. | 161—68 |
| 3,402,560 | 9/1968 | Alm | 181—33 |
| 3,407,159 | 10/1968 | Fink et al. | 260—30.6X |

JOHN T. GOOLKASIAN, Primary Examiner

G. W. MOXON II, Assistant Examiner

U.S. Cl. X.R.

161—186, 218; 181—33; 248—21; 260—30.6, 31.8, 837